US010477291B2

United States Patent
Litovsky et al.

(10) Patent No.: US 10,477,291 B2
(45) Date of Patent: Nov. 12, 2019

(54) AUDIO DEVICE

(71) Applicant: Bose Corporation, Framingham, MA (US)

(72) Inventors: Roman N. Litovsky, Newton, MA (US); Chester S. Williams, Lexington, MA (US)

(73) Assignee: Bose Corporation, Framingham, MA (US)

( * ) Notice: Subject to any disclaimer, the term of this patent is extended or adjusted under 35 U.S.C. 154(b) by 108 days.

(21) Appl. No.: 15/220,479

(22) Filed: Jul. 27, 2016

(65) Prior Publication Data

US 2018/0035186 A1 Feb. 1, 2018

(51) Int. Cl.
| H04R 1/00 | (2006.01) |
| H04R 1/02 | (2006.01) |
| G06F 17/28 | (2006.01) |
| H04R 1/32 | (2006.01) |
| H04R 3/12 | (2006.01) |

(52) U.S. Cl.
CPC ............ *H04R 1/026* (2013.01); *G06F 17/289* (2013.01); *H04R 1/323* (2013.01); *H04R 3/12* (2013.01)

(58) Field of Classification Search
CPC .................................................. H04R 1/1041
USPC .... 381/67, 71.6, 74, 301, 333, 334, 385, 17, 381/73.1, 91
See application file for complete search history.

(56) References Cited

U.S. PATENT DOCUMENTS

| 4,070,553 | A | * | 1/1978 | Hass | H04M 1/05 381/301 |
| 5,133,017 | A | * | 7/1992 | Cain | G01R 33/3854 381/71.4 |
| 5,617,477 | A | * | 4/1997 | Boyden | H04R 3/12 381/309 |
| 5,682,434 | A | | 10/1997 | Boyden | |
| 6,301,367 | B1 | | 10/2001 | Boyden et al. | |
| 7,167,567 | B1 | * | 1/2007 | Sibbald | H04S 5/00 381/17 |
| 8,340,311 | B2 | * | 12/2012 | Villarreal, Jr. | A42B 3/30 381/384 |
| 9,100,732 | B1 | | 8/2015 | Dong et al. | |
| 2008/0080733 | A1 | * | 4/2008 | Mei | H04R 1/1066 381/379 |
| 2012/0114130 | A1 | * | 5/2012 | Lovitt | G10L 21/028 381/73.1 |
| 2013/0279729 | A1 | * | 10/2013 | Richards | H04R 5/023 381/333 |
| 2015/0156583 | A1 | * | 6/2015 | Mulumudi | H04R 1/46 381/67 |
| 2016/0066078 | A1 | * | 3/2016 | Baek | G06F 1/163 381/74 |
| 2016/0192066 | A1 | * | 6/2016 | Benattar | G01P 15/18 381/91 |
| 2017/0245065 | A1 | * | 8/2017 | Suhami | H04R 25/505 |

* cited by examiner

*Primary Examiner* — Md S Elahee
(74) *Attorney, Agent, or Firm* — Brian M. Dingman; Dingman IP Law, PC

(57) ABSTRACT

An audio device with a structure such as an acoustic waveguide, and first and second spaced acoustic transducers that are carried by the structure. A controller is adapted to change the location of the dominant sound source produced by the transducers together in the far field. The device can also be used in a method of facilitating speech communication between two people who speak different languages.

24 Claims, 7 Drawing Sheets

AUDIO DEVICE

BACKGROUND

This disclosure relates to an audio device.

Wearable audio devices are designed to serve the needs of the wearer by providing near-field sound to the ears. This can be achieved in many ways, including the use of acoustic transducers arranged in a housing that is designed to go around the neck.

SUMMARY

In some cases there is a need to optimize the sound performance of an audio device to provide a better experience for the wearer and/or for a person standing in front of the wearer. This can be achieved by changing the sound level and physical location of the dominant sound sources as perceived by the listeners. A preferred approach involves such control by electrical means only, as is further described.

All examples and features mentioned below can be combined in any technically possible way.

In one aspect, an audio device includes a structure that is adapted to be worn by a person, two spaced acoustic transducers carried by the structure, and a controller that is adapted to change the location of the dominant sound source produced by the two transducers together in the far field.

Embodiments may include one of the following features, or any combination thereof. The controller may be adapted to change the location of the dominant sound source produced by the two transducers together in the far field over a frequency range. The frequency range may be from about 200 Hz to about 600 Hz. The controller may be adapted to change one or more of the amplitude and relative phases of the two transducers. The controller may be adapted to operate the transducers in a first mode where the dominant far field sound emanates from the transducers, and a second mode where the dominant far field sound emanates from a location between the transducers. Over a frequency range from about 200 Hz to about 600 Hz the sound pressure level in the far field in the second mode may exceed that of the first mode by at least about 12 dB.

Embodiments may include one of the following features, or any combination thereof. The structure may include an acoustic waveguide with first and second ends and a middle opening located approximately equidistantly from the ends. The first acoustic transducer may be acoustically coupled to the waveguide proximate the first end, and the second acoustic transducer may be acoustically coupled to the waveguide proximate the second end. The first and second acoustic transducers may each be further arranged to project sound outwardly from the waveguide. There may be a resonant element such as a passive radiator or a second waveguide coupled to the middle opening.

Embodiments may include one of the following features, or any combination thereof. The audio device may also have a neck loop that is constructed and arranged to be worn around the neck, wherein the waveguide is located at least in part within the neck loop. There may be a flow diverter in the waveguide proximate the outlet. The waveguide may be generally "U"-shaped, with a port located approximately equidistantly from the ends and having a port distal end, wherein the outlet is at the port distal end. The port may comprise a tube that is acoustically coupled to the waveguide. There may be a flow diverter in the waveguide proximate the tube. The flow diverter may be generally triangular.

Embodiments may include one of the following features, or any combination thereof. The controller may establish two operational modes, a first operational mode wherein the first and second acoustic transducers are in phase and a second operational mode wherein the first and second acoustic transducers are out of phase. The controller may enable the first operational mode in response to the user speaking, and the controller may enable the second operational mode in response to a person other than the user speaking. In the first mode sound may radiate outwardly from the waveguide via the outlet, and in the second mode sound may radiate outwardly from the waveguide directly from the transducers or via at least one opening, distinct from the outlet, in the waveguide.

Embodiments may include one of the following features, or any combination thereof. The audio device may also have one or more microphones. The audio device may include a neck loop that is constructed and arranged to be worn around the neck of a user, and the waveguide may be located at least in part within the neck loop, where the microphone is carried by the neck loop. The microphone may have variable directionality.

In another aspect an audio device includes an acoustic waveguide with first and second ends and a port tube located approximately equidistantly from the ends and having an outlet. There is a neck loop that is constructed and arranged to be worn around the neck, wherein the waveguide is located at least in part within the neck loop. There are first and second acoustic transducers, wherein the first acoustic transducer is acoustically coupled to the waveguide proximate the first end, and the second acoustic transducer is acoustically coupled to the waveguide proximate the second end, and wherein the first and second acoustic transducers are each further arranged to project sound outwardly from the waveguide. A controller controls one or more of the relative phases and amplitudes of the first and second acoustic transducers.

Embodiments may include one of the following features, or any combination thereof. The controller may establish two operational modes, a first operational mode wherein the first and second acoustic transducers are in phase and a second operational mode wherein the first and second acoustic transducers are out of phase, and wherein the controller enables the first operational mode in response to the user speaking and the controller enables the second operational mode in response to a person other than the user speaking.

In another aspect, a method of controlling an audio device to assist with oral communication between a device user and another person, wherein the audio device comprises an acoustic waveguide with first and second ends, an outlet, and first and second acoustic transducers, wherein the first acoustic transducer is acoustically coupled to the waveguide proximate the first end, and the second acoustic transducer is acoustically coupled to the waveguide proximate the second end, and wherein the first and second acoustic transducers are each further arranged to project sound outwardly from the waveguide, includes receiving a speech signal that originates from the user's voice, providing to the transducers a first audio signal that is based on the received user's speech signal, where the first audio signal is played by the transducers in phase, receiving a speech signal that originates from the other person's voice, and providing to the transducers a second audio signal that is based on the received other person's speech signal, where the second audio signal is played by the transducers out of phase.

Embodiments may include one of the following features, or any combination thereof. The method may further comprise obtaining a translation of the received user's speech signal from the user's language into a different language, and wherein the first audio signal is based on the translation. The method may further comprise obtaining a translation of the received other person's speech signal from the other person's language into the user's language, and wherein the second audio signal is based on the translation into the user's language. When the first audio signal is played sound may radiate outwardly from the waveguide via the outlet, and when the second audio signal is played sound may radiate outwardly from the waveguide directly from the transducers or via at least one opening, distinct from the outlet, in the waveguide.

DETAILED DESCRIPTION

Figure 1:
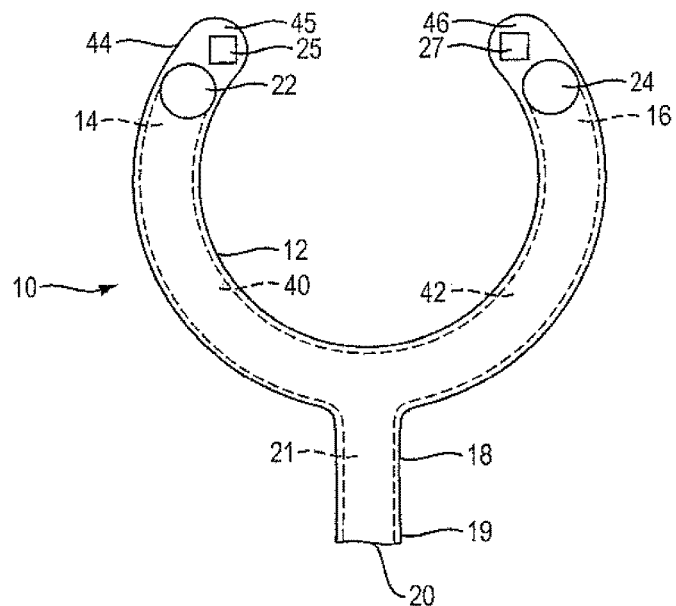
FIG. 1 is a top view of an audio device.

In some examples, the audio device described herein is adapted to be worn on the body of the user, for example on the upper torso around the neck. The audio device is adapted to alternately radiate sound in the near field for the wearer and in the far field for a person close to the wearer (e.g., a person standing in front of the wearer). In the audio device a controller changes the acoustic radiation pattern in order to produce the most optimum sound for both cases.

For the wearer, the sound field around each ear is important, while far field radiation makes no difference to the wearer but for others close by it is best if the far field radiation is suppressed. For a person listening while standing in front of the wearer the far field sound is important. It is also helpful to a listener if this far field sound has an isotropic acoustic radiation pattern and broad spatial coverage as would be the case if the sound was coming from a human mouth.

While the near field sound field for the wearer can be created by two acoustic transducers (one close to each ear), the far field sound with isotropic acoustic radiation pattern can be created with one point radiation source, which mimics the way humans speak—the mouth is a point source with isotropic spatial directivity. And the location of this point source should be different from the location of the transducers serving the ears of the wearer. Ideally, the point source is symmetric with respect to the human body of the wearer, and is farther away from the wearer's ears so as to offer a louder sound to the person standing in front of the wearer. The acoustic device described herein includes one or more acoustic transducers that can produce sound perceived to be emanating from a first physical location or a second physical location depending on whether near field sound for the wearer or far field sound for a person other than the wearer is desired.

The audio device is thus able to change the acoustic spatial directivity and the physical location of the dominating sound sources on demand. The audio device includes a sound system that can be electrically switched from a dual sound source for local listening by the wearer of the acoustic device to a single sound source for out loud listening by person(s) located in the far field. In one non-limiting example these objectives can be accomplished with a first waveguide driven by at least two transducers located closer to or at its ends, with an opening at the middle point of the waveguide. There can be a resonant element at this middle point opening, such as a passive radiator or an additional waveguide having one end coupled with the waveguide middle opening and another open end.

With this construction, phase differences between the transducers can be used to create two modes of operation. In a first "private" mode, both transducers are driven out of phase such that the middle point of the first waveguide corresponds to zero pressure and so the radiation from the opening, the passive radiator or the second waveguide coupled to this middle point is almost non-existent (in the ideal linear case the radiation at this point is exactly zero). For the wearer this mode is a natural sound system operation with relatively low sound spillage to the far field.

In a second "out loud" mode, both transducers are driven in phase. In this case the middle point of the first waveguide is driven by a combined pressure from both transducers and so the acoustic radiation at the middle opening (e.g., from the open end of the second waveguide, or produced by the passive radiator located at the middle point) is maximized, thus best serving a person standing in front of the resonant element (but also producing sound that would be heard by person(s) located in other places near the wearer). The radiation pattern of this middle resonant opening is similar to a point source, offering an isotropic directivity for better speech intelligibility. Because the main energy of the human voice spectrally is in about the 100-400 Hz range, when the resonance of the waveguide system (i.e., both waveguides together or the waveguide and the passive radiator) is in the range of about 200-300 Hz the waveguide output will greatly exceed the transducer output and the apparent sound source will shift from the transducers themselves to the middle location.

This acoustic device design achieves an audio system operation in which a phase difference between two transducers can either provide the sound to the wearer (with lower spillage to the far field), or sound to the wearer and to the far field with isotropic directivity.

This approach can also be used with other sound systems where the design can benefit from the electrical control of the location of an acoustic radiation source. By using a waveguide, or a combination of acoustic elements containing various acoustic elements like transducers, waveguides, passive radiators and the like, it is possible to control the "active" points in the system by changing the relative phase and/or amplitude of the signals driving the transducers. In this way the maximum of acoustic energy will be radiated from the dedicated element of the sound system thus moving the physical location of the radiation source. For example, in the example above if the second waveguide or the passive radiator is tuned to the bass frequency range, the device can function as a home theater sound bar: when the left and right transducers are operated out of phase the sound bar will be a dipole speaker with a null in the middle plane, radiating the energy mostly to the sides (i.e., accomplishing spatial sound), and when the transducers are operated in phase the middle point waveguide or passive radiator will produce bass with isotropic directivity.

Audio device 10, FIG. 1, includes an acoustic waveguide 12 with first and second ends 14 and 16, respectively, and an opening or outlet 20 located approximately equidistantly from ends 14 and 16. Waveguide 12 is in this case a curved, generally "U"-shaped tube with first interior leg 40 and second interior leg 42. Waveguide 12 is located at least in part within the interior of neck loop 44 with spaced ends 45 and 46; neck loop 44 is further described below. First and second acoustic transducers 22 and 24, respectively, are acoustically coupled to waveguide 12, with transducer 22 coupled to leg 40 and transducer 24 coupled to leg 42. First acoustic transducer 22 is acoustically coupled to waveguide 12 proximate its first end 14, and second acoustic transducer 24 is acoustically coupled to waveguide 12 proximate its second end 16. First and second acoustic transducers 22 and 24 are each further arranged to project sound outwardly from waveguide 12. A controller (shown in FIG. 5) is adapted to control the relative phases of the first and second acoustic transducers.

Waveguide 12 also includes port or second waveguide 18 with distal end 19 where outlet 20 is located. Port 18 may be accomplished by a tube with interior 21 that is mechanically and acoustically coupled to both legs 40 and 42. Microphones 25 and 27 are carried by neck loop 44. Although two microphones are shown, the acoustic device can alternatively have no microphones, one microphone, or more than two microphones. The microphones may be carried by the neck loop. The microphones may have variable directionality, a feature that can be used so that the microphones are directed to alternately detect the voice of the user of the audio device and the voice of another person located close to the user. Operating modes of audio device 10 are further described below.

Audio transducers 22 and 24 are preferably open-backed transducers that are constructed and arranged to project sound from both their front side and their back side. Although two transducers are shown, the acoustic device can alternatively have more than two transducers. When transducers 22 and 24 are operated in phase, they simultaneously create sound pressure in waveguide 12. This sound pressure can escape the waveguide via opening 20 of port 18, and so can be heard by persons in the vicinity of opening 20. Transducers 22 and 24 also project sound outwardly from the neck loop, which accordingly can be heard by the user. Thus, when the transducers are operated in phase sound may be heard by the user and others who are nearby. Waveguide 12 can be constructed and arranged to have some gain (e.g., about 12 dB) in the normal speech band so that sound leaving the center outlet 20 is louder than would be the case if the transducers were used without the waveguide. When transducers 22 and 24 are operated 180 degrees out of phase there is little or no sound pressure at opening 20, so there is little or no sound spillage that can be heard by persons in the vicinity of the user. However, the transducers still project sound outwardly, so the user can hear the sound. Also, since this outwardly projected sound is out of phase there will be some cancellation in the far field, which reduces undesirable far-field sound spillage.

Figure 2:
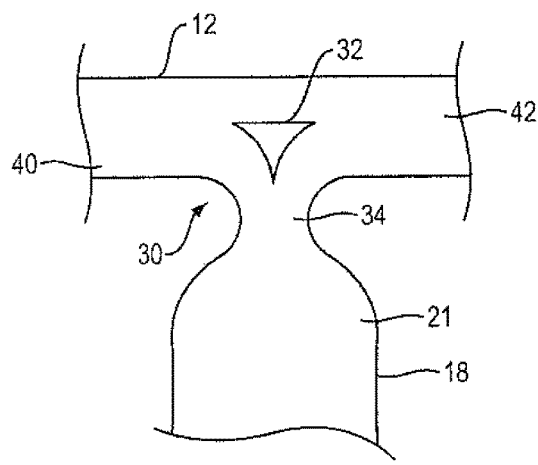
FIG. 2 is a partial, schematic, cross-sectional view of a waveguide of the acoustic device of FIG. 1.

There may be some air turbulence around the intersection 30 of waveguide interior legs 40 and 42 with interior 21 of tube 18. See FIG. 2. Air turbulence can have an impact on airflow to port 18. Turbulence can also cause unwanted noise. Turbulence can be decreased by use of a generally triangular flow diverter 32 that helps to smooth the transition between legs 40 and 42 and interior 21. The flow diverter can have a shape other than generally triangular, which may in part depend on the construction and shape of the intersection of the two waveguides. Also, pinching in the sides of tube 18 in area 34 (where tube 18 meets tube 12) creates narrower regions where air flows into and out of interior 21, which further reduces turbulence.

Figure 3:
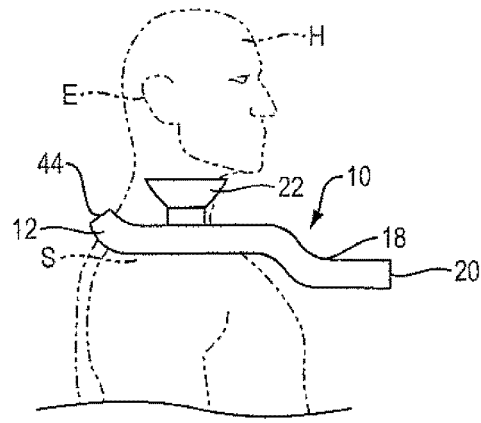
FIG. 3 is a right side view of a person wearing the audio device of FIG. 1.

Audio device 10 can have a desired form factor, which may depend on its intended use. One non-limiting example of a form factor is schematically depicted in FIG. 3. Neck loop 44 is constructed and arranged to be worn partially around the neck and on shoulders S of a user with head H and ear E. The space between ends 45 and 46 allows neck loop 44 to be placed on shoulders S, below ear E of head H. Transducer 22 (which is depicted much larger and protruding more than would likely be the case in an actual product) can be located generally below ear E in a generally vertical orientation (when the wearer is standing up) such that it projects sound outwardly from the waveguide toward ear E. Alternatively, the transducers can be located elsewhere on the neck loop and elsewhere relative to the waveguide, for example as explained below relative to FIG. 4. Tube 18 (which is also depicted much larger and protruding more than would likely be the case in an actual product) projects forwardly, so that sound leaving opening 20 is directed toward another person in front of the device user. Device 10 can thus be used to assist in communications between the user and this other person. In a non-limiting example discussed below regarding FIGS. 5 and 6, device 10 can be used in translating communications between the user and this other person. Although not shown in FIG. 3, the device 10 may include a stabilizing element or lanyard that connects between ends 45 and 46 behind a wearer's neck.

Figure 4:
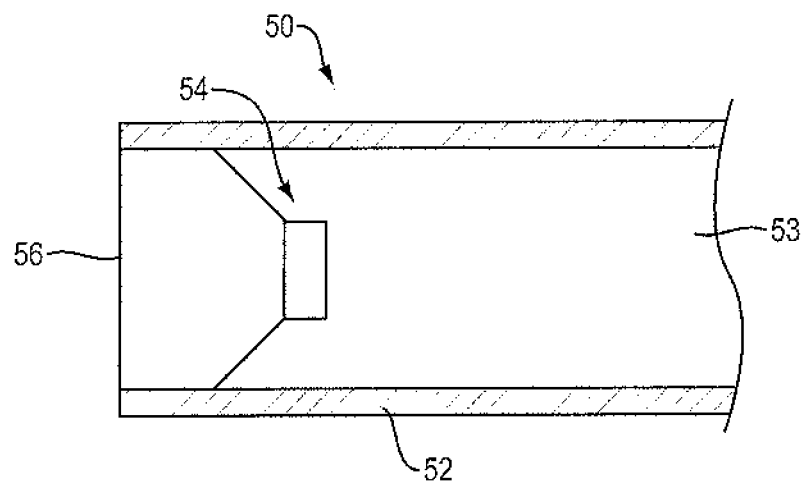
FIG. 4 is a partial cross-sectional view of an end of an alternative audio device.

FIG. 4 illustrates one end of an alternative waveguide 50, where transducer 54 is in a generally horizontal orientation (when the wearer is standing up), having its front side located at or close to waveguide end opening 56 through which sound is projected. The back side of transducer 54 radiates sound into waveguide interior 53 defined by waveguide tube 52. FIG. 4 is but one of many possible alternative locations of the transducers of the audio device herein, where the transducers are acoustically coupled to the waveguide and are also arranged to project sound outwardly from the waveguide. When relatively small transducers are used, they tend to be generally omni-directional and so their location on the waveguide and the direction in which they point is not critical to the performance of the audio device.

Figure 5:
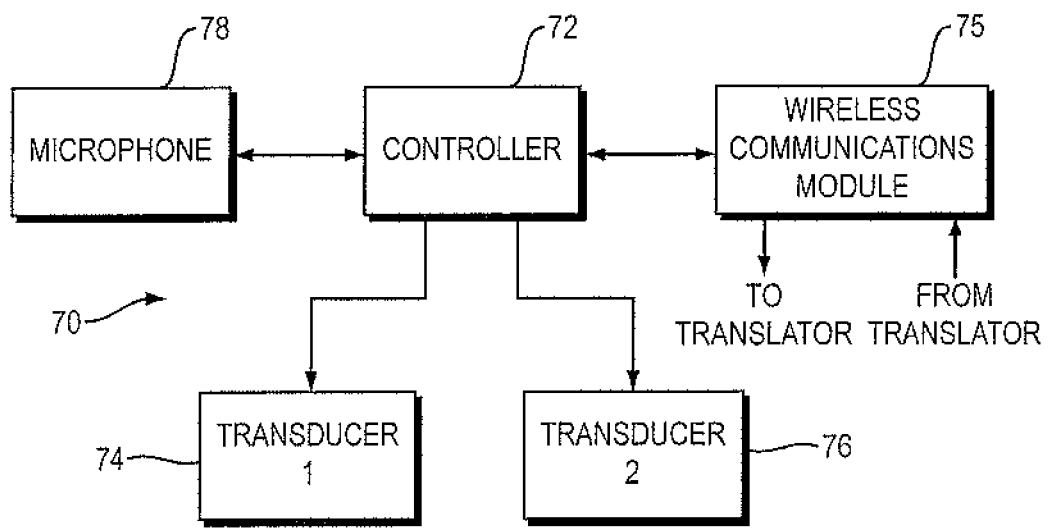
FIG. 5 is a schematic block diagram of elements of an audio device.

FIG. 5 is a schematic block diagram of components of one example of an audio device of the present disclosure that can be used in translating spoken communication between the audio device user and another person. Controller 72 controls the relative phases of first acoustic transducer 74 and second acoustic transducer 76. Controller 72 also receives an output signal from microphone 78, which can be used to detect speech of the user and another person located close to the user, as explained below. Wireless communications module 75 is adapted to send signals from controller 72 to a translation program (e.g., Google Translate), and receive signals from the translation program and pass them to controller 72. Wireless communications module 75 may be, for example, a Bluetooth® radio (utilizing Bluetooth® or Bluetooth® Low Energy) or may use other communication protocols, such as Near Field Communications (NFC), IEEE 802.11, or other local area network (LAN) or personal area network (PAN) protocols. The translation program may be located in a separate device (e.g., a smartphone) connected to the audio device via a wireless connection, or the translation program may be located in a remote server (e.g., the cloud) and the audio device may wirelessly transmit signals to the translation program directly or indirectly via a separate connected device (e.g., a smartphone). Controller 72 may establish two operational modes, a first mode wherein the first and second acoustic transducers 74 and 76 are operated in-phase, and a second mode wherein the first and second acoustic transducers 74 and 76 are operated out of phase. Controller 72 may enable the first operational mode in response to the user speaking, and controller 72 may enable the second operational mode in response to a person other than the user speaking. In the first mode sound may radiate outwardly from the waveguide via the outlet (e.g., outlet 20, FIG. 1), and in the second mode sound may radiate outwardly from the waveguide via at least one opening (e.g., opening 56, FIG. 4), distinct from the outlet, in the waveguide.

The selection of the mode can done automatically by one or more microphones (either on board the acoustic device or in a connected device) that detect where the sound is coming from (i.e. the wearer or another person) or by an application residing in a smartphone connected to the audio device via a wired or wireless connection based on the content of the speech (language recognition), or by manipulation of a user interface, for example.

The controller element of FIG. 5 is shown and described as a discrete element in a block diagram. It may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

Figure 6:
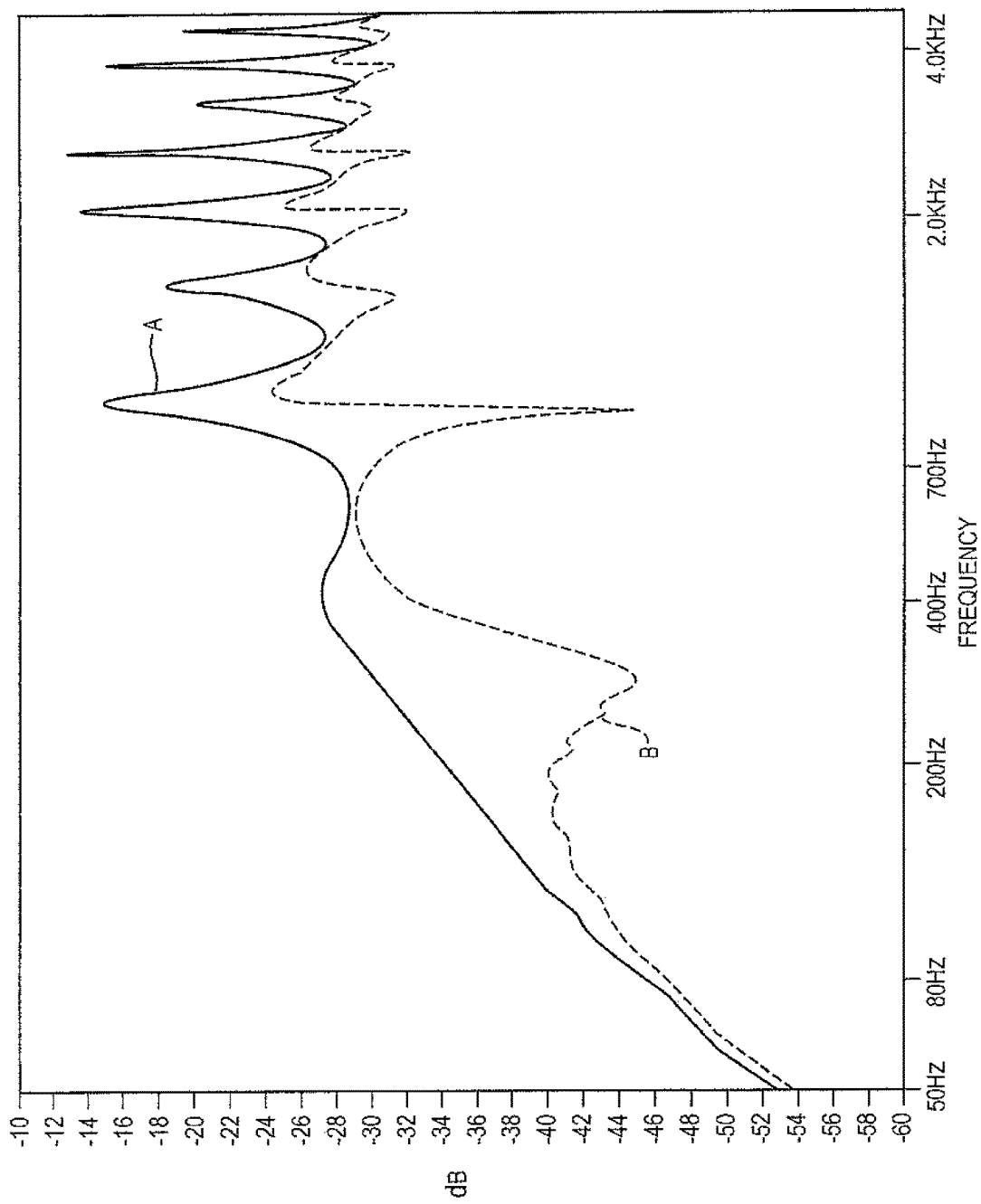
FIG. 6 illustrates far field power with the two transducers of the audio device of FIG. 1 operated in phase.
Figure 7:
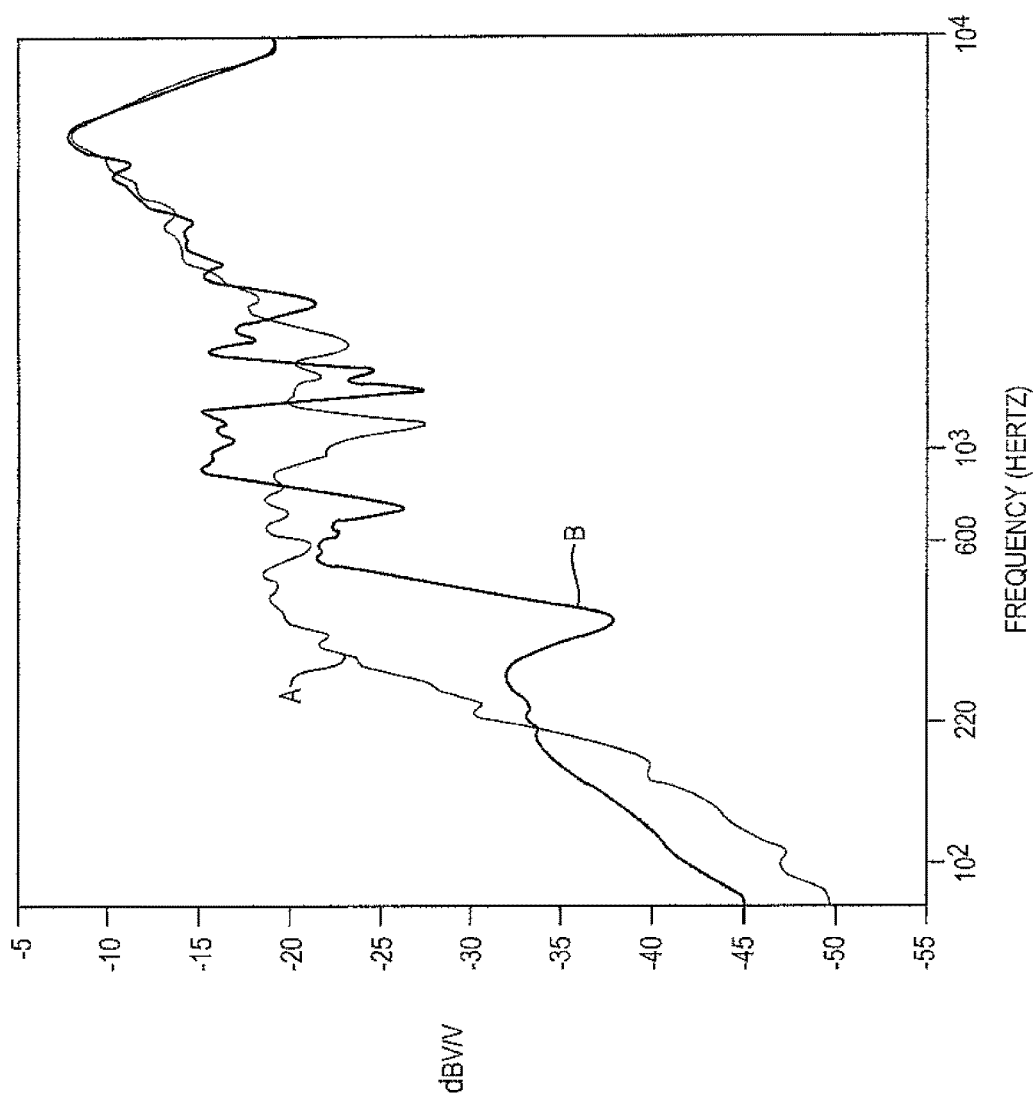
FIG. 7 illustrates near field power (at the user's ears) with the two transducers of the audio device of FIG. 1 operated in phase and out of phase.
Figure 8:
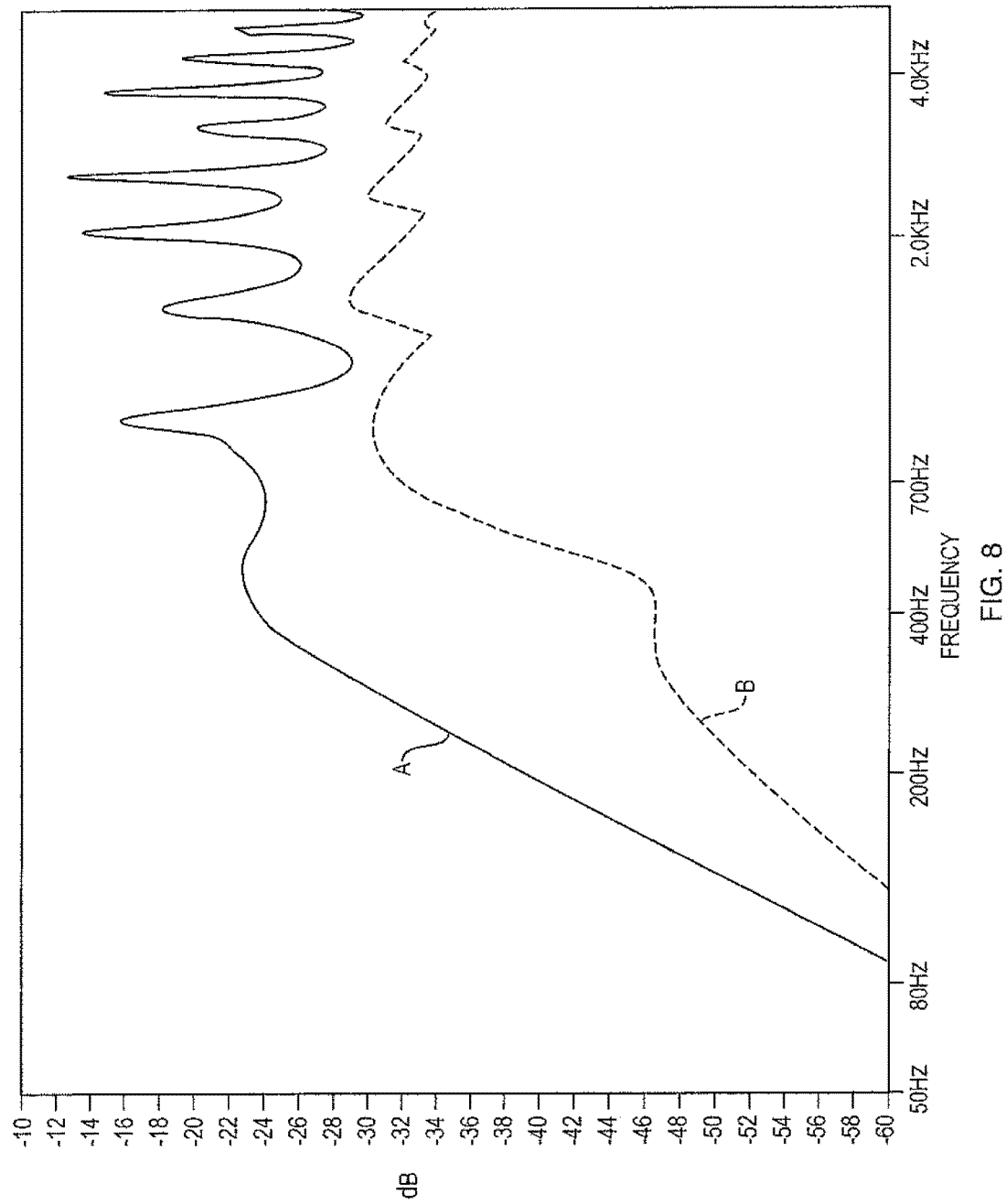
FIG. 8 illustrates far field power (directly in front of the user) with the two transducers of the audio device of FIG. 1 operated in phase and out of phase.

FIGS. 6-8 together illustrate the acoustic power (in dB) for various frequencies in both the near field and the far field when transducers 22 and 24, FIG. 1, are operated in both operational modes—in phase and out of phase. FIG. 6 illustrates far field power (e.g., directly in front of the user) with the two transducers in phase; power is illustrated from the midpoint (e.g., opening 20, FIG. 1), plot A, and from the two transducers, plot B. In the frequency range from about 120 Hz to about 600 Hz there is a boost in far field power due to the waveguide. FIG. 7 illustrates near field power (at the user's ears) with the transducers in phase (plot A) and out of phase (plot B). The power boost in the frequency range from about 220 to about 600 Hz is due to radiation from opening 20 when the transducers are operated in phase. FIG. 8 illustrates far field power (directly in front of the user) with the transducers in phase (plot A) and out of phase (plot B), for a waveguide tuned to about 250 Hz, where a large boost is seen. When the transducers are out of phase the bass roll off is strong due to the inactive waveguide and the left/right cancellation in the far field.

Figure 9:
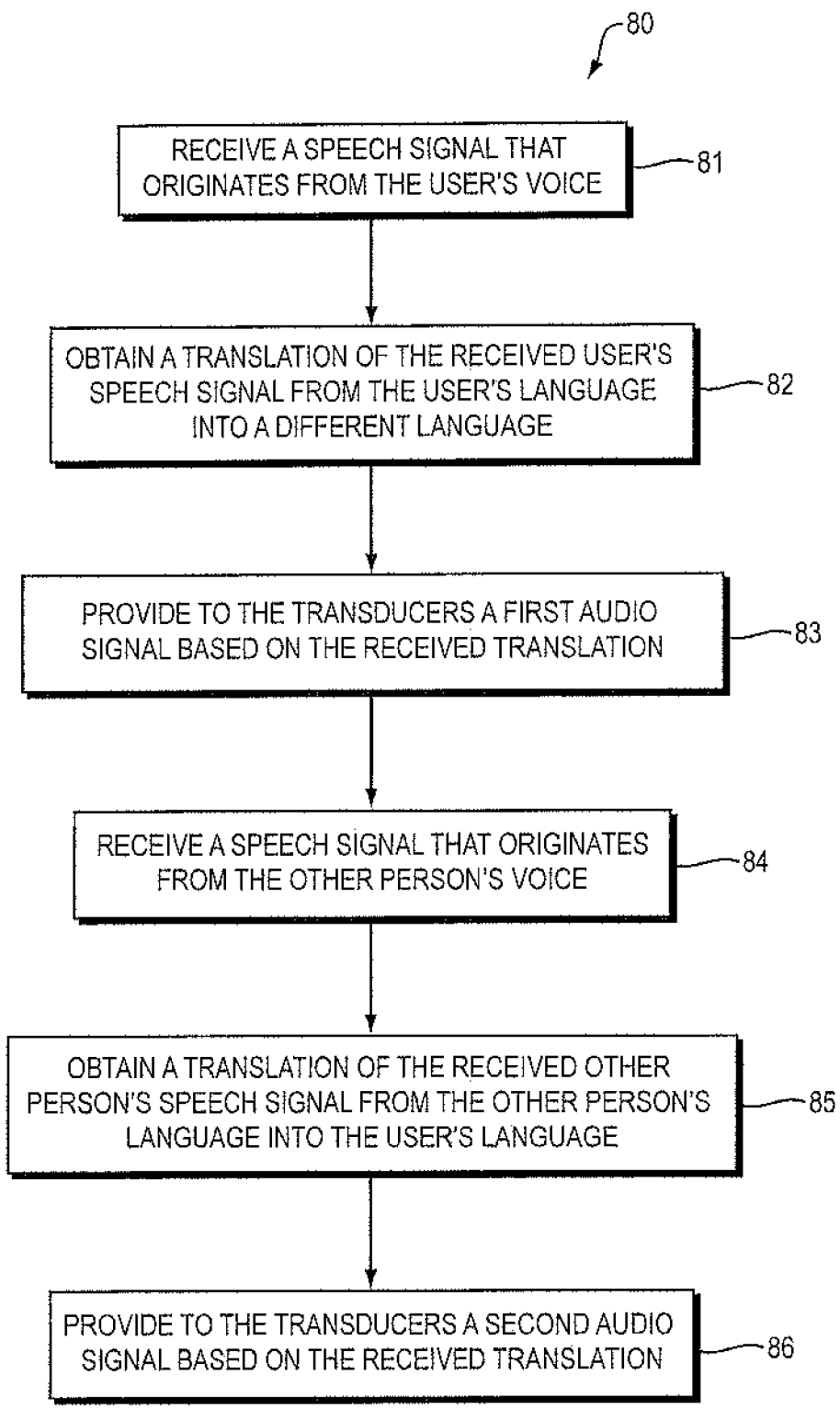
FIG. 9 illustrates steps of a method of controlling an audio device to assist with a communication between two people.

A method 80 of controlling an audio device to assist with oral communication between a device user and another person is set forth in FIG. 9. Method 80 contemplates the use of an audio device such as those described above. In one non-limiting example the audio device can have an acoustic waveguide with first and second ends, an outlet, and first and second acoustic transducers, wherein the first acoustic transducer is acoustically coupled to the waveguide proximate the first end, and the second acoustic transducer is acoustically coupled to the waveguide proximate the second end, and wherein the first and second acoustic transducers are each further arranged to project sound outwardly from the waveguide (see, e.g., FIG. 1). In method 80, a speech signal that originates from the user's voice is received, step 81. The speech signal can be detected by a microphone carried by the audio device (e.g., either or both of microphones 25 and 27, FIG. 1), with the microphone output provided to the controller. Alternatively, the speech signals can be detected by a microphone integral to a device connected (via a wired or wireless connection) to the audio device. A translation of the received user's speech from the user's language into a different language is then obtained, step 82. In one non-limiting example, the present audio device can communicate with a portable computing device such as a smartphone, and the smartphone can be involved in obtaining the translation. For example, the smartphone may be enabled to obtain translations from an internet translation site such as Google Translate. The controller can use the translation as the basis for an audio signal that is provided to the two transducers. In the example described above, the translation can be played by the transducers in-phase, so that a sound signal is projected from the waveguide via its outlet (e.g., outlet 20, FIG. 1). This allows a person close to the user to hear the translated speech signal.

In step 84, a (second) speech signal that originates from the other person's voice is received. A translation of the received other person's speech from the other person's language into the user's language is then obtained, step 85. A second audio signal that is based on this received translation is provided to the transducers. In the example described above, the translation can be played by the transducers out of phase, so that little or no sound is projected from the waveguide via its outlet (e.g., outlet 20, FIG. 1), but the sound can be heard by the user.

Method 80 operates such that the wearer of the audio device can speak normally, the speech is detected and translated into a selected language (typically, the language of the other person with whom the user is speaking). The audio device then plays the translation such that it is projected from the center outlet of the audio device. The wearer's speech is thus projected from the front of the wearer (perhaps close to but below the mouth), but in the other person's language. Then, when the other person speaks the speech is detected and translated into the wearer's language. The audio device then plays this translation such that it is projected outwardly from the waveguide but not from the center outlet of the audio device; the translation is thus audible to the wearer but is less audible to the other person (or third parties who are in the same vicinity). The device thus allows relatively private, translated communications between two people who do not speak the same language.

Figure 10:
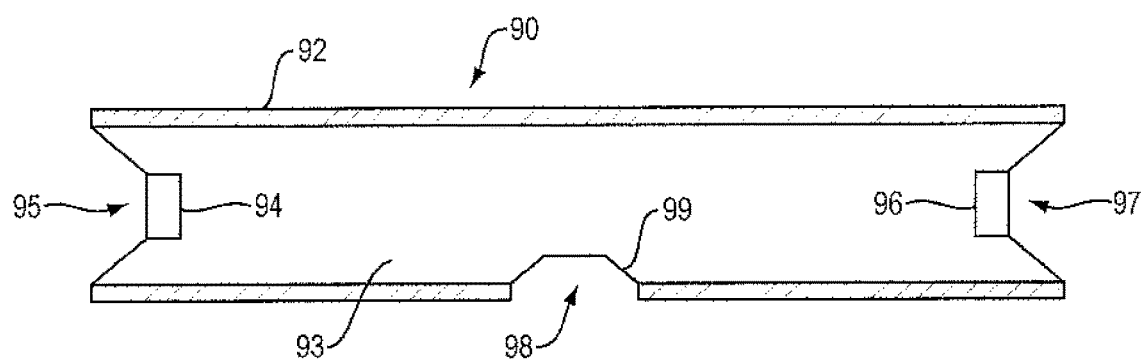
FIG. 10 is a cross-sectional view of the waveguide and transducers of an acoustic device.

The present audio device can be used in other manners. For example, the audio device can be used like a sound bar or other home theater device that is adapted to play left, right and center audio signals, such as for television or computer applications. Sound bars are well known in the art. Waveguide 90, FIG. 10, can be used as a sound bar, for example as part of a sound system for an audiovisual device. Waveguide 90 has interior 93 defined within tube 92. Waveguide 90 may be disposed within a separate housing (not shown). Left acoustic transducer 94 directly radiates from left waveguide opening 95 and right acoustic transducer 96 directly radiates from right waveguide opening 97. As before, the transducers 94 and 96 may be in a generally horizontal orientation as shown, or may be in other orientations (e.g., generally vertical orientation). When transducers 94 and 96 are played in-phase, sound is also projected from center outlet 98 (which may be an opening or port); passive radiator 99 can be located at opening 98 to provide a resonant element, e.g., in order to boost bass frequencies, but passive radiator 99 is not required. Center outlet 98/resonant element 99 can thus be used like a center channel of a multichannel audio system such as a 5.1 system, while transducers 94 and 96 can be used as the left and right channels, respectively. Waveguide 90 can also be used as a stand-alone music player. If the transducers are played out of phase there will be little sound spillage from the center outlet that might interfere with the music directly radiated from the front of the two transducers.

A number of implementations have been described. Nevertheless, it will be understood that additional modifications may be made without departing from the scope of the inventive concepts described herein, and, accordingly, other embodiments are within the scope of the following claims.

What is claimed is:

1. An audio device, comprising:
   a structure that is adapted to be worn by a person;
   two spaced acoustic transducers that each project sound and are carried by the structure; and
   a controller that is adapted to change a location of a dominant sound source produced by the two transducers together in a far field, wherein the controller is adapted to change the relative phases of the two transducers.

2. The audio device of claim 1, wherein the controller is adapted to change the location of the dominant sound source produced by the two transducers together in the far field over a frequency range.

3. The audio device of claim 2, wherein the frequency range is from about 200 Hz to about 600 Hz.

4. The audio device of claim 1, wherein the controller is adapted to change the amplitude of the two transducers.

5. The audio device of claim 1, wherein the controller is adapted to operate the transducers in a first mode where the dominant far field sound emanates from the transducers, and a second mode where the dominant far field sound emanates from a location between the transducers.

6. The audio device of claim 5, wherein over a frequency range from about 200 Hz to about 600 Hz the sound pressure level in the far field in the second mode exceeds that of the first mode by at least about 12 dB.

7. The audio device of claim 1 wherein:
   the structure comprises an acoustic waveguide with first and second ends and an outlet located approximately equidistantly from the ends;
   the first acoustic transducer is acoustically coupled to the waveguide proximate the first end, and the second acoustic transducer is acoustically coupled to the waveguide proximate the second end; and
   the first and second acoustic transducers are each further arranged to project sound outwardly from the waveguide.

8. The audio device of claim 7, further comprising a neck loop that is constructed and arranged to be worn around the neck, wherein the waveguide is located at least in part within the neck loop.

9. The audio device of claim 7, further comprising a flow diverter in the waveguide proximate the outlet.

10. The audio device of claim 7, wherein the waveguide is generally "U"-shaped, with a port located approximately equidistantly from the ends and having a port distal end, wherein the outlet is at the port distal end.

11. The audio device of claim 10, wherein the port comprises a tube that is acoustically coupled to the waveguide.

12. The audio device of claim 11, further comprising a flow diverter in the waveguide proximate the tube.

13. The audio device of claim 12, wherein the flow diverter is generally triangular.

14. The audio device of claim 7, wherein the controller establishes two operational modes, a first operational mode wherein the first and second acoustic transducers are in phase and a second operational mode wherein the first and second acoustic transducers are out of phase.

15. The audio device of claim 14, further comprising a neck loop that is constructed and arranged to be worn around the neck of a user, wherein the waveguide is located at least in part within the neck loop.

16. The audio device of claim 14, wherein the controller enables the first operational mode in response to the user speaking.

17. The audio device of claim 16, wherein the controller enables the second operational mode in response to a person other than the user speaking.

18. The audio device of claim 14, wherein in the first operational mode, sound radiates outwardly from the waveguide via the outlet, and wherein in the second operational mode, sound radiates outwardly from the waveguide via at least one opening, distinct from the outlet, in the waveguide.

19. The audio device of claim 7, further comprising a microphone.

20. The audio device of claim 19, further comprising a neck loop that is constructed and arranged to be worn around the neck of a user, wherein the waveguide is located at least in part within the neck loop, and wherein the microphone is carried by the neck loop.

21. The audio device of claim 19, wherein the microphone has variable directionality.

22. The audio device of claim 7, further comprising a resonant element coupled to the waveguide outlet.

23. An audio device, comprising:
   an acoustic waveguide with first and second ends and a port tube located approximately equidistantly from the ends and having an outlet;
   a neck loop that is constructed and arranged to be worn around the neck, wherein the waveguide is located at least in part within the neck loop;
   first and second acoustic transducers, wherein the first acoustic transducer is acoustically coupled to the waveguide proximate the first end, and the second acoustic transducer is acoustically coupled to the waveguide proximate the second end, and wherein the first and second acoustic transducers are each further arranged to project sound outwardly from the waveguide; and
a controller that controls the relative phases of the first and second acoustic transducers.

24. The audio device of claim 23, wherein the controller establishes two operational modes, a first operational mode wherein the first and second acoustic transducers are in phase and a second operational mode wherein the first and second acoustic transducers are out of phase, and wherein the controller enables the first operational mode in response to the user speaking and the controller enables the second operational mode in response to a person other than the user speaking.

\* \* \* \* \*